United States Patent [19]

Grappe

[11] Patent Number: 4,805,445
[45] Date of Patent: Feb. 21, 1989

[54] PROCESS FOR MONITORING THE LEAKTIGHTNESS OF A STORAGE FACILITY

[75] Inventor: Jacques Grappe, Paris, France

[73] Assignee: Societe Francaise de Stockage Geologique- Geostock, Rueil Malmaison Cedex, France

[21] Appl. No.: 66,669

[22] Filed: Jun. 26, 1987

[30] Foreign Application Priority Data

Jul. 2, 1986 [FR] France .............................. 86 09650

[51] Int. Cl.⁴ .......................................... G01M 3/32
[52] U.S. Cl. .................................................. 73/49.2
[58] Field of Search ........................ 73/49.2, 40, 40.7

[56] References Cited

U.S. PATENT DOCUMENTS

| | | | |
|---|---|---|---|
| 3,444,725 | 5/1969 | Chave | 73/40.7 |
| 3,848,765 | 11/1974 | Durkop | 73/49.2 |
| 3,908,468 | 9/1975 | Katsuta et al. | 73/49.2 |
| 3,942,331 | 3/1976 | Newman, Jr. et al. | 73/40.7 |
| 4,374,478 | 2/1983 | Secord et al. | 73/49.2 |
| 4,404,844 | 9/1983 | Hegler | 73/49.2 |
| 4,524,609 | 6/1985 | Sharp | 73/49.2 |
| 4,542,626 | 9/1985 | Colin | 62/45 |
| 4,561,292 | 12/1985 | Pugnale et al. | 73/49.2 |
| 4,676,093 | 6/1987 | Pugnale et al. | 73/49.2 |
| 4,685,327 | 8/1987 | Sharp | 73/49.2 |
| 4,696,186 | 9/1987 | Sharp | 73/49.2 |

FOREIGN PATENT DOCUMENTS

| | | | |
|---|---|---|---|
| 2141041 | 2/1973 | Fed. Rep. of Germany | 73/49.2 |
| 2735804 | 2/1979 | Fed. Rep. of Germany | 73/49.2 |

*Primary Examiner*—Stewart J. Levy
*Assistant Examiner*—Hezron F. Williams
*Attorney, Agent, or Firm*—Sughrue, Mion, Zinn, Macpeak, and Seas

[57] ABSTRACT

A storage device has an inner enclosure (6) and a leakproof and a rigid outer enclosure (5), which are mounted one inside the other and separated by an intermediate space (9) containing a fluid, continuous in phase at pressures other than that of the material stored, and pressure measurement equipment (16, 15) enabling the differences in the pressure of the fluid to be monitored. Advantageously, the device additionally features sampling equipment (18, 17) enabling the composition of the fluid to be monitored. The device may be buried, the outer enclosure being then placed against the cement walls (4) of a cavity, which may be a drilled well. The inner enclosure may feature a leakproof skin which is made rigid by the presence in the intermediate space of a porous and rigid filling material in which the fluid can circulate.

12 Claims, 1 Drawing Sheet

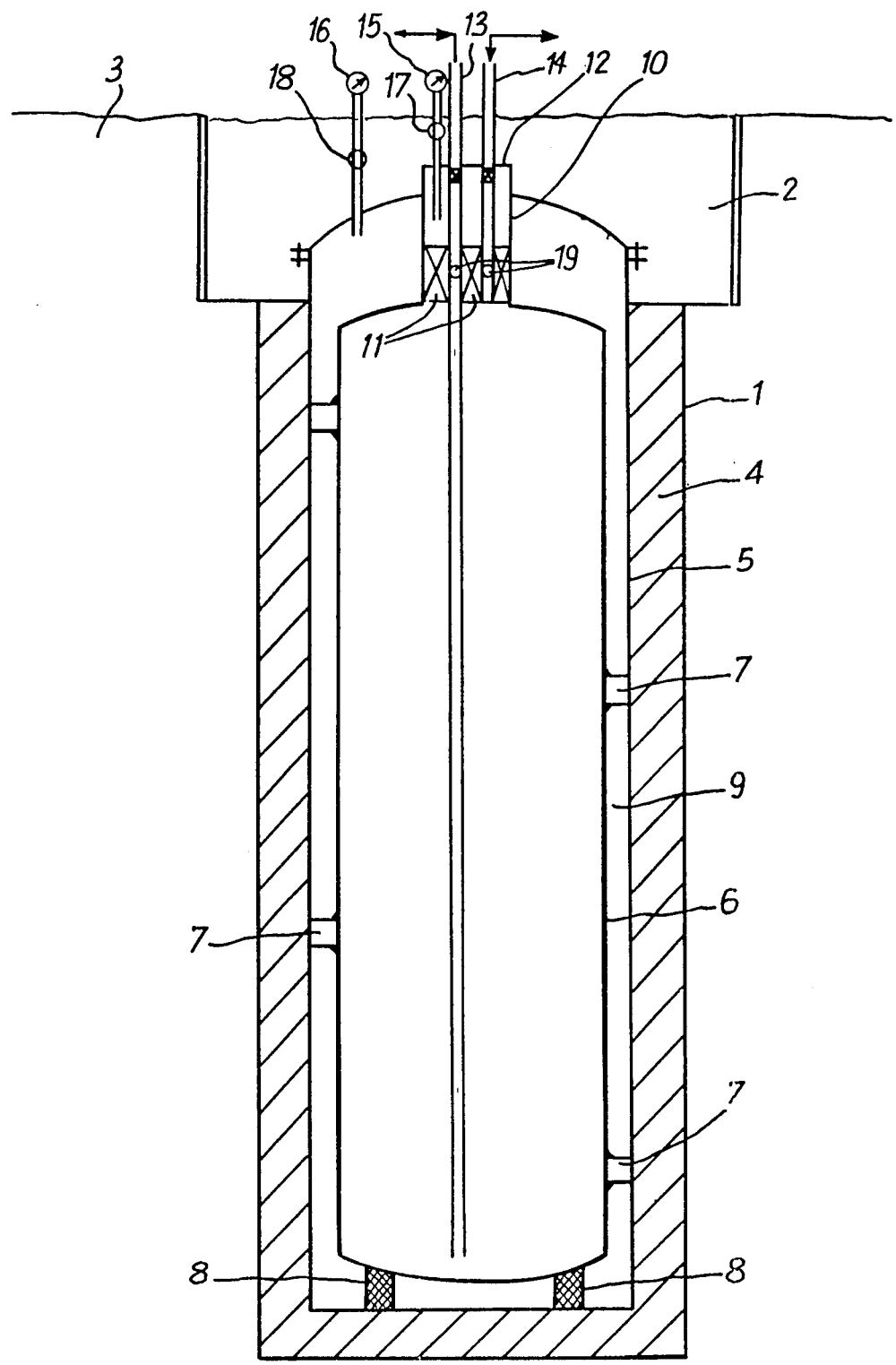

PROCESS FOR MONITORING THE LEAKTIGHTNESS OF A STORAGE FACILITY

The present invention relates to a process for monitoring the leaktightness of a storage facility, and a device for storing hazardous materials, especially gases under pressure or liquefied gases, or liquids, enabling this process to be utilized.

Processes for monitoring the leaktightness of a storage facility are already known, for example that described in French Patent Application No. 83/06,822 in the name of the Geostock Company, that application having as a U.S. equivalent U.S. Pat. No. 4,542,626. This describes an underground storage facility for a liquefiable and water-miscible material such as ammonia, in which the storage facility is installed at a depth such that the hydrostatic water pressure in the ground is higher than the highest pressure capable of being envisaged for the material which is stored and, with the storage being carried out in an impervious enclosure housed in the cavity, an annular drainage space is provided around the said enclosure and is maintained at a pressure which is lower than the lowest pressure capable of being envisaged for the material which is stored. Thus, in the event of rupture of the enclosure, the material is recovered in a well filled with water, since it goes down as far as the cavity level, and it can be detected therein. In addition, there is then no contamination of the material with water, and no pollution of the groundwater table.

SUMMARY OF THE INVENTION

The objective of the present invention is to offer a process for monitoring a storage facility enabling greater safety to be obtained in respect of leakages capable of affecting this storage facility and their consequences, and a storage device enabling this process to be utilized, this device additionally providing, by virtue of its design, a double seal between the material which is stored and the outside.

According to the present invention, a process for monitoring the leaktightness of a storage facility for a material consists in providing around the said material a leakproof and sufficiently rigid double enclosure containing, at a pressure other than that of the material which is stored, a fluid whose pressure changes are monitored. Changes in the composition of the fluid may also be advantageously monitored. The said fluid is advantageously continuous in phase, so as to be capable of transmitting the said pressure changes, and is preferably, but not necessarily, at a lower pressure relative to the material stored.

Still according to the present invention, a device for storing a material enabling the process of the invention to be utilized comprises an inner enclosure and an outer enclosure, both being rigid and leakproof, mounted one inside the other and separated by an intermediate space, the inner enclosure comprising an opening extended by a neck extending outwards as far as the outer enclosure, the said neck being closed at the height of each of the enclosures by an inner plug and an outer plug, these being themselves pierced by conduits, particularly for the entry and/or discharge of the said material which is stored in the inner enclosure, the said intermediate space and the said neck containing a fluid continuous in phase at pressures other than that of the material stored, and means for measuring and/or controlling, or monitoring, pressure enabling the pressures of the said fluid to be monitored.

According to an advantageous embodiment of the device of the invention, the fluid composition is known and the device may additionally comprise a sampling means permitting the composition of the fluid to be monitored when this is desired. The fluid pressure is then advantageously lower than that of the material stored, and a circulation of the said fluid is established in the said intermediate space.

In a particular application of the device of the invention, the storage facility for the fluid is underground and outer enclosure is placed against the cement or concrete walls of a cavity produced by drilling. According to an advantageous alternative form of this particular application, the inner enclosure consists of a leakproof inner skin resting against a porous and rigid filling material which extends from the said leakproof skin as far as the said outer enclosure bearing on the cement or concrete walls of the said cavity which has been produced by drilling. The rigidity of the inner enclosure is thus due to the insertion of the said filling material between the said leakproof skin and the said outer enclosure. The porosity of the filling material allows the said fluid to circulate through it. The material in question may be porous concrete, certain polyurethane foams, glass foams known as "Foamglas", or any other open-cell foam. The leakproof inner skin may, for example, be made of steel or of polyester.

In an embodiment of this alternative form, the said leakproof skin is placed flat against the said filling material by evacuation of the intermediate space relative to the material stored, the said intermediate space being at least partially occupied by the said filling material.

Other features and advantages of the present invention will become clearer from reading of the description which follows, which is given by way of nonlimiting examples of the possible embodiments of the invention, with reference to the appended drawing, and which will make it properly understood how the invention may be implemented.

BRIEF DESCRIPTION OF THE DRAWINGS

The single FIGURE shows diagrammatically the cross-section of an embodiment of the device of the invention, applied to the underground storage of a hazardous material.

DETAILED DESCRIPTION OF THE PREFERRED EMBODIMENT

Shown in cross-section in the single FIGURE is an elongate vertical cavity 1 above which is an excavation 2, both cut into the ground 3. The outer enclosure 5 is placed against a layer of cement 4 which covers the walls and the bottom of the cavity 1. To do this, the outer enclosure 5 may be lowered into the cavity, leaving a casing space between this enclosure and the walls and the bottom of the cavity, and then cement may be injected into this casing space, starting with its lower part, especially the bottom of the said outer enclosure. A rigid inner enclosure 6 is separated from the outer enclosure 5 by side or centring props 7 and bottom props or feet 8. The said props define an intermediate (annular) space 9 between the inner enclosure 6 and the outer enclosure 5. The upper parts of the said inner and outer enclosures are closed, in or in the vicinity of the excavation 2, ensuring the continuity of the annular space 9 as far as an opening made in the upper part of the inner enclosure 6 and extended by a neck 10 which is continued until it reaches and passes slightly beyond the outer enclosure 5. The said neck is closed at the height of the inner enclosure by an inner plug 11, and by an outer closure 12 substantially at the height of the outer enclosure 5. The closure 12 and the plug 11 are pierced by pipes 13 and 14, which can be used for conveying a material which is to be stored in the inner enclosure 6. The neck 10 closes the annular space 9 at the top of the two enclosures. The pipes 13 and 14 are closed by means of safety valves 19 at the height of the plug 11.

The annular space 9 and the interior of the neck 10 are filled with a fluid of known composition at pressures which are also known and which are below the storage pressure of the said material, and means of measuring and controlling or monitoring pressure 16, 15 and of sampling 18, 17 make it possible to check the pressures and to monitor the compositions of the fluid held inside the neck 10 and the annular space 9 respectively.

A material storage facility has thus been produced, which offers double sealing in respect of the exterior generally and the ground in particular, because of the presence of the two successive enclosures. Furthermore, a possible leakage from either of the two enclosures can be detected at all times. In fact, if a leakage occurs, for example, in the inner enclosure 6, the pressure of the said fluid will increase in the annular space 9, and it will be possible to observe this by virtue of the oressure monitoring means 16 and, since the proportion of the material stored in the fluid will also increase, it will be possible to observe a change in its composition by virtue of the sampling means 18. Similarly, it is possible to monitor the changes in the pressure and composition of the fluid held in the neck 10, by virtue of the pressure monitoring and sampling means 15 and 17 respectively. If a leakage occurs in the outer enclosure 5, the pressure of the said fluid will also change if it has been chosen beforehand to be other than that prevailing in the ground, because of the intrinsic permeability of the cement layer 4.

While both the pressure changes and the changes in the composition of the said fluid may be monitored simultaneously, it is also possible to determine which of the two enclosures is leaking and, if desired, to repair, to change the composition of the said fluid, to recover the fluid or, in general, to undertake any intervention that might be desirable.

The monitoring of the pressure and/or composition changes may be performed at regular intervals, but it is also possible to couple the means for monitoring pressure or for sampling to alarm systems which are capable of being triggered above certain predetermined threshold changes in pressure or in composition.

The cavity may be a drilled well whose depth is large in relation to the diameter. The depth of a drilled well of this kind may be up to one hundred or even several hundred meters, and the diameter may be between a few decimeters and two or three meters. The outer enclosure must be sufficiently strong to withstand at least the hydrostatic pressure of the ground through the cement.

The pipes 13 and 14 may be used for conveying the material stored, either by carrying the material itself or by carrying a fluid which displaces the said material. Depending on the circumstances, the pipes 13 and 14 may be used equally well as an inlet or an outlet for the said material or the said displacement fluid.

Since the whole unit is buried, including, if appropriate, the head of the storage facility, which is situated in the excavation 2 which may be backfilled, it is not very vulnerable to external attack and to accidents that might take place on the surface.

It is obvious that this embodiment is merely an example and that it would be possible to modify it, particularly by substitution with equivalent methods without departing thereby from the scope of the invention.

I claim:

1. Method for storing a fluid product under pressure, comprising the following steps:

providing around said material a leakproof inner enclosure (6) and a leakproof and rigid outer enclosure (5), providing spacing means (7, 8) for maintaining an intermediate space (9) between the two enclosures so that a first fluid continuous in phase can be circulated in said intermediate space, said first fluid having a known composition and exhibiting a first pressure other than that of the material stored, providing, in the inner enclosure, an opening in the shape of a neck (10), said neck extending outwards at least as far as the outer enclosure (5), said neck being closed by an outer closure (12), and also being closed by an inner plug (11) at the height of the inner enclosure, said neck containing conduits (13, 14) for conveying said stored material into or out of the inner enclosure (6), introducing in said neck a second fluid continuous in phase, having a second known composition and exhibiting a second pressure other than the pressure of the stored material, and providing monitoring means (15, 17) for monitoring said second pressure and said second composition of said second fluid.

2. Method according to claim 1, characterized in that said first and second pressures are nearly equal and below that of the material stored.

3. Method according to claim 2, characterized in that said inner enclosure comprises a flexible leakproof inner skin and said spacing means comprises a porous filling material.

4. Method according to claim 1, further including the step of providing second monitoring means (16, 18) for monitoring said first pressure and said first composition of said first fluid.

5. Device for storing a fluid product under pressure, comprising a leakproof inner enclosure (6) and a leakproof and rigid outer enclosure (5), which are mounted one inside the other, spacing means (7, 8) for maintaining an intermediate space (9) between said enclosures so that a first fluid continuous in phase can be circulated in said intermediate space, said first fluid having a first known composition and exhibiting a first pressure other than that of the material stored, said device being characterized in that the inner enclosure (6) has an opening in the shape of a neck (10), said neck extending outwards at least as far as the outer enclosure (5), said neck being closed by an outer closure (12) and also being closed, at the height of the inner enclosure (6), by an inner plug (11), said neck containing conduits (13, 14) for conveying said stored material into or out of the inner enclosure (6);

said device being further characterized in that a second fluid, continuous in phase, and having a second known composition and exhibiting a second pressure other than that of the material stored, is introduced in said neck;

said device further comprising monitoring means (15, 17) for monitoring said second pressure and said second composition of said second fluid.

6. Device according to claim 5, characterized in that the first and second pressures are substantially equal and are lower than that of the material stored.

7. Device according to claim 5, characterized in that the outer enclosure is placed in an underground cavity (1), said device further comprising walls (4) made of at least one of cement and concrete, said outer enclosure being placed against said walls, and said walls lining said underground cavity.

8. Device according to claim 7, characterized in that the said cavity (1) is vertical and of elongate shape.

9. Device according to claim 7, characterized in that the said cavity is a drilled well whose diameter is small in relation to its depth.

10. Device according to claim 5, characterized in that the said inner enclosure comprises a flexible leakproof inner skin, said spacing means comprising a porous and rigid filling material.

11. Device according to claim 7, characterized in that the said inner enclosure comprises a leakproof inner skin, said device further comprising a porous and rigid filling material disposed between said inner enclosure and said outer enclosure and at least partially occupying the said intermediate space, and through which the said fluid can circulate.

12. Device according to claim 5, further comprises second monitoring means (16, 18) for monitoring said first pressure and said first composition of said first fluid.

* * * * *